United States Patent [19]
Yasuda et al.

[11] Patent Number: 6,071,627
[45] Date of Patent: Jun. 6, 2000

[54] HEAT-RESISTANT MEMBER AND A METHOD FOR EVALUATING QUALITY OF A HEAT-RESISTANT MEMBER

[75] Inventors: Kazuhiro Yasuda; Seiichi Suenaga, both of Yokohama; Kunihiko Wada, Kawasaki; Hiroki Inagaki, Yokohama; Masako Nakahashi, Tokyo, all of Japan

[73] Assignee: Kabushiki Kaisha Toshiba, Japan

[21] Appl. No.: 08/827,200

[22] Filed: Mar. 28, 1997

[30] Foreign Application Priority Data

Mar. 29, 1996 [JP] Japan ................................. 8-076077

[51] Int. Cl.$^7$ ............................. B22D 25/00; B21B 1/00; B21D 39/00
[52] U.S. Cl. ......................... 428/610; 428/612; 428/621; 428/622; 428/623; 428/632; 428/667; 428/469; 428/472
[58] Field of Search ..................... 428/621, 622, 428/623, 632, 667, 678, 610, 612, 433, 469, 472; 427/453, 446

[56] References Cited

U.S. PATENT DOCUMENTS

| | | | |
|---|---|---|---|
| 5,334,462 | 8/1994 | Vine et al. | 428/697 |
| 5,455,119 | 10/1995 | Taylor et al. | 428/632 |
| 5,484,980 | 1/1996 | Pratt et al. | 219/121.65 |
| 5,538,796 | 7/1996 | Schaffer et al. | 428/469 |
| 5,579,534 | 11/1996 | Itoh et al. | 428/547 |
| 5,667,641 | 9/1997 | Poirer et al. | 162/207 |
| 5,716,720 | 2/1998 | Murphy | 428/623 |
| 5,803,852 | 9/1998 | Agnostinelli et al. | 474/161 |

OTHER PUBLICATIONS

Yoshiaki Arata et al., "Structure and Properties of Plasma Sprayed Alumina Coatings", Journal of the High Temperature Institute, vol. 14, No. 5, pp. 220–233.

Chiori Takahashi, "Microstructural Analysis of Plasma–Sprayed Alumina Coatings by Image Processing Technique", Thermal Spraying, vol. 30, No. 3, Sep. 1993, pp. 34–41.

Yasuda et al., "Relationship Between Microstructure of Plasma–Sprayed 8YZ Coating and Thermal Fatigue Life of Thermal Barrier Coating," International Symposium in Designing, Processing and Properties of Advanced Engineering Materials, 1997, Toyohashi, Japan, pp. 721–726.

Davis et al., Wear, vol. 110, pp. 101–116, Jul. 1986.

*Primary Examiner*—Paul Thibodeau
*Assistant Examiner*—Holly C. Rickman
*Attorney, Agent, or Firm*—Finnegan, Henderson, Farabow, Garrett & Dunner, L.L.P.

[57] ABSTRACT

A ceramic coating layer which is not less than 70 μm in the maximum height Rmax of its profile curves and not less than 45 μm in the 10-point average roughness, or which is less than 650 HV in Vickers hardness is provided on a metallic substrate. A heat-resistant member of such composition is excellent in thermal fatigue resistance and keeps an excellent heat resistance for a long period of time. Quality of a heat-resistant member is evaluated by, measuring at least one of roughness and hardness of a ceramic coating layer on a metallic substrate. According to this method, it is possible to easily and accurately evaluate a thermal resistant life of a heat-resistant member.

10 Claims, 4 Drawing Sheets

PROFILE CURVE
PR
AVERAGE LINE

HEAT-RESISTANT MEMBER AND A METHOD FOR EVALUATING QUALITY OF A HEAT-RESISTANT MEMBER

BACKGROUND OF THE INVENTION

1. Field of the Invention

The present invention relates to a heat-resistant member having a ceramic coating layer and a method for evaluating quality of a heat-resistant member.

2. Description of Related Art

A combustor, a nozzle, a blade, and the like forming a heat engine such as a jet engine, a gas turbine, or the like are used in a severe environment in which a high temperature and stress are applied to them. Up to now, therefore, a heat-resistant member made of a heat-resistant alloy has been used as a material for these machines.

In recent years, however, as a demand for making higher the temperature at which such machines as described above are used has become great in order to more effectively utilize energy resources, a heat-resistant member to be used in them has been required to be more greatly improved in heat resistance.

Thereupon, in order to meet such a demand, a heat-resistant member composed of a metallic substrate coated with a ceramic material which is small in thermal conductivity as a heat isolation layer has begun to be used.

Up to now, as a ceramic material of this kind, zirconia, for example, $Y_2O_3$-stabilized zirconia, CaO-stabilized zirconia, MgO-stabilized zirconia, and $CaSiO_3$ and the like have been proposed and among them the stabilized zirconia, which is small in thermal conductivity and large in thermal expansion coefficient, is commonly used. The reason why a ceramic material having a large thermal expansion coefficient is used is that it is well matched with a metallic substrate.

As a means for coating such a ceramic material on a metallic substrate, a thermal spraying method is generally used for economic reasons.

However, in such a heat-resistant member having an existing ceramic coating layer, there has been a problem that spalling or delamination is induced in the ceramic coating layer while it is used for a long period of time and its original excellent heat resistance cannot be kept. It is thought that this is caused mainly by a thermal stress generated in the ceramic coating layer by difference of thermal expansion coefficience between a ceramic layer and a metal member.

And up to now, a standard for evaluating a ceramic coating layer in nondestructive method to predict its performance or properties has not been established and therefore, there has been also a problem that it is difficult to form in good repeatability a ceramic coating layer which is excellent in property making it possible to keep its heat resistance for a long time.

SUMMARY OF THE INVENTION

An object of the present invention is to provide a heat resistant member which is excellent in thermal fatigue resistance of its ceramic coating layer and can keep an excellent heat resistance for a long period of time.

Another object of the invention is to provide a method for evaluating quality of a heat-resistant member, said method making it possible to easily and accurately judge a thermal fatigue resistance of its ceramic coating layer and making it possible to manufacture in good repeatability a ceramic coating layer excellent in thermal fatigue resistance, thanks to it, a heat-resistant member which keeps an excellent heat resistance for a long period of time.

The first invention of this application is a heat-resistant member comprising a metallic substrate and a ceramic coating layer covering a surface of the metallic substrate, wherein said ceramic coating layer is not less than 70 μm in Rmax of its profile curves and not less than 45 μm in Rz.

The second invention of this application is a heat resistant member comprising a metallic substrate and a ceramic coating layer covering a surface of the metallic substrate, wherein said ceramic coating layer is less than 650 HV in Vickers hardness.

The third invention of this application is a method for evaluating quality of a heat-resistant member comprising a metallic substrate and a ceramic coating layer covering a surface of the metallic substrate, said method comprising a step of measuring at least one of roughness and hardness of said ceramic coating layer.

In the heat-resistant member of the first invention of this application, since the ceramic coating layer covering a surface of the metallic substrate is not less than 70 μm in Rmax of its profile curves and not less than 60 μm in Rz and since this layer relaxes a thermal stress by occurrence of minute cracks while it is used in a high-temperature environment, spalling or delamination in the ceramic coating layer is suppressed. Accordingly, its excellent heat resistance is kept for a long period of time.

Similarly, in the heat-resistant member of the second invention of this application, the ceramic coating layer covering a surface of the metallic substrate is less than 650 HV in Vickers hardness and since this layer relaxes a thermal stress by occurrence of minute cracks while it is used in a high-temperature environment, spalling or delamination in the ceramic coating layer is suppressed. Accordingly, its excellent heat resistance is kept for a long period of time.

And in the method for evaluating quality of the heat-resistant member of the third invention of this application, since at least one of roughness and hardness of the ceramic coating layer which have a great influence upon its thermal fatigue resistance is measured, a thermal fatigue resistance of the ceramic coating layer can be easily and accurately evaluated and judged, and thanks to this, it is possible to manufacture in good repeatability a ceramic coating layer excellent in thermal fatigue resistance and, thanks to it, it is possible to manufacture a heat-resistant member which can keep an excellent heat resistance for a long period of time.

DESCRIPTION OF THE PREFERRED EMBODIMENTS

Embodiments of the present invention are described in the following.

Figure 1:
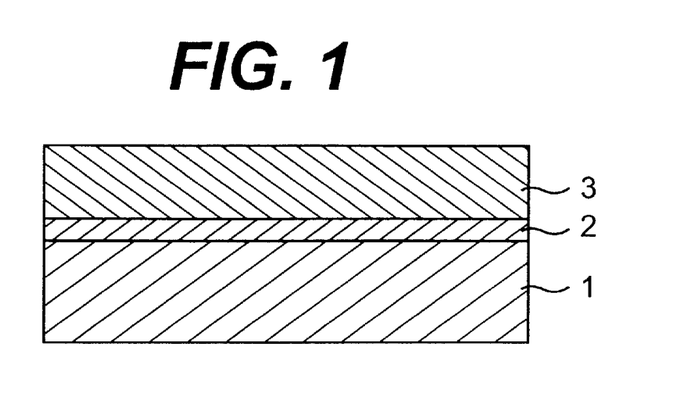
FIG. 1 is a sectional view schematically showing structure of an embodiment of a first heat-resistant member of the present invention.

FIG. 1 is a sectional view schematically showing structure of an embodiment of a heat-resistant member of the present invention.

In FIG. 1, reference number 1 is a metallic substrate, and a metal bonding layer 2 and a ceramic coating layer 3 which is not less than 70 μm in Rmax of its profile curves and is not less than 45 μm in Rz are formed one after another on this metallic substrate 1 as coatings of it.

As a material for said metallic substrate 1, such a heat resistant alloy as an Ni-based alloy, a Co-based alloy or the like is preferably used, and in practical use, particularly an Ni-based superalloy such as Hastelloy X, Mar-M247, IN738LC, CMSX-2, CMSX-4, GTD111 or the like, or a Co-based superalloy such as FSX414, Haynes188, L-605, MAR-M509 or the like is preferably used.

Although the metal bonding layer 2 is not always indispensable in the present invention, this is preferable in a point of making it possible to relax a thermal stress caused by difference in thermal expansion coefficient between the metallic substrate 1 and the ceramic coating layer 3, and making it possible to improve the heat-resistant member in its oxidation-limited life.

As a material for this metal bonding layer 2, an Ni—Co—Cr—Al—Y alloy, an Ni—Cr—Al—Y alloy, a Co—Ni—Cr—Al—Y alloy, a Co—Cr—Al—Y alloy, an Ni—Cr—Al alloy, and the like are mentioned. This metal bonding layer 2 is preferably 50 to 250 μm or so in thickness and is usually about 150 μm. When it is too thick, a thermal stress applied to the ceramic coating layer 3 becomes great and delamination or spalling is liable to happen in the ceramic coating layer 3, and on the other hand, when it is too thin, an effect of improving the metallic substrate 1 in oxidation resistance or in relaxation of a thermal stress is small. As a method for forming this metal bonding layer 1, an atmospheric plasma spraying method, a low-pressure spraying method, a PVD method, a CVD method, a pack cementation method, a sputtering method and the like can be used.

The greater the surface of a metal part in contact with the ceramic coating layer 3, namely, the surface of the metallic substrate 1 or the metal bonding layer is in roughness, the more greatly its adhesion to the ceramic coating layer 3 is increased and the ceramic coating layer 3 is improved in thermal fatigue resistance. Concretely, roughness of the surface of the metallic substrate 1 or the metal bonding layer 2 is preferably not less than 70 μm in Rmax and is not less than 40 μm in Rz. In order to make greater the roughness of the surface of the metallic substrate 1, it is effective to apply in advance a surface treatment such as a sandblasting process to the surface of the metallic substrate 2 before forming the ceramic coating layer 3 on it. And in order to make greater the roughness of the surface of the metal bonding layer 2, it is effective to use an atmospheric plasma spraying process for forming the metal bonding layer 2. A process of forming first a metal bonding layer on a metallic substrate 1 by means of a low-pressure spraying method and then forming another metal bonding layer greater in roughness on the surface of it by means of an atmospheric plasma spraying method is more preferable from a point of making it possible to improve the member also in oxidation resistance. Furthermore, a metal bonding layer formed by a low-pressure plasma spraying method which layer is great in the surface roughness and is compact in its internal structure (whose cavity fraction is not greater than 5 vol % as known from an image analyzing process of observing a sectional structure) is more preferable from a point of being great in adhesion to the ceramic coating layer 3 and excellent in an oxidization preventing effect.

As a material for said ceramic coating layer 3, ceramic materials large in thermal expansion coefficient such as stabilized zirconia, rare earth oxides, calcium phosphate, aluminum-rare earth complex oxides and the like may be used, and particularly, the stabilized zirconia greater in thermal expansion coefficient and lower in thermal conductivity is preferably used from a point of heat resistance. As a stabilizing element, rare earth elements including Y are mentioned, and particularly, Y, Nd, Ce, Pr, Pm, and Sm are preferable from a point of making it possible to obtain a ceramic coating layer excellent in high-temperature stability and chemical stability.

In case of a ceramic coating layer 3 composed of stabilized zirconia, it is preferably composed of zirconia of 90 vol % or more in tetragonal phase. And in a rare earth-stabilized zirconia, a stabilizing element is preferably 4.0 to 28.0 mol % ($YO_{1.5}$:mol %) in solid solubility. When it is not greater than 4.0 mol %, it is poor in chemical stability, and when it exceeds 28.0 mol %, the ceramic coating layer 3 is deteriorated in strength. A more preferable range of the solid solubility of a stabilizing element is 6.0 to 25.0 mol %, and it can give a ceramic coating layer 3 excellent in mechanical strength and thermal fatigue resistance. The solid solubility of a stabilizing element is estimated by measuring a lattice constant of the zirconia by means of an x-ray diffraction method.

In order to more improve its chemical stability and phase stability at high temperature, it is desirable that a stabilizing element is dissolved as a solid solution in the zirconia structure as uniformly as possible in microscopic level. Concretely, in a ceramic coating layer composed of a stabilized zirconia, when measuring a rare earth element distribution of concentration in a measuring area of a probe 1 μm φ by an electron probe microanalyzer (EPMA), it is desirable that a standard deviation (σ) of concentration at the respective measuring points in relation to the concentration of the rare earth element in a prepared composition is not greater than 0.8. In case of $Y_2O_3$-stabilized zirconia, for example, the measurement is performed by means of a 3-mol % (5.4-wt %) $Y_2O_3$-stabilized zirconia sintered body. And in a measuring area of 20 nm φ by a transmission electron microscope (TEM), it is desirable that a standard deviation (σ) of concentration at the respective measuring points in relation to the density of the rare earth element in a prepared composition is not greater than 1.2. Such a ceramic coating layer having a uniform distribution of a rare earth element concentration can be formed by spraying the powder where the rare earth element is uniformly distributed in advance onto a metallic substrate.

The ceramic coating layer 3 can usually do with 50 to 1000 μm or so in thickness, depending upon its application, and in case of a nozzle or a blade of a gas turbine, it can do with 150 to 300 μm or so.

Roughness of the ceramic coating layer 3, as described above, is not less than 70 μm in Rmax of its profile curves and is not less than 45 μm in Rz. The roughness of the ceramic coating layer 3 in this case is computed from a profile curve formed by interfaces between particles inside the ceramic coating layer 3 obtained by observation of a sectional structure of the ceramic coating layer 3 by means of an SEM or measured the surface of the ceramic coating layer 3 which is forming or has been formed in each profile curve. A profile curve can be obtained by tracing the shape of particle boundaries between particles in the ceramic coating layer 3 in a direction nearly in parallel with the surface of the metallic substrate 1 on an SEM photograph of a section having a continuous measuring distance of 4 mm. The roughness is computed from this profile curve in conformity to JIS-B601-1982. It is preferable to take five or more profile curves and take the average of roughness values obtained from the respective profile curves. Any of the Rmax, Rz, profile curves, and average lines used in the invention is in conformity to JIS-B601-1982. In case that good interfaces between particles or good particle boundaries are difficult to observe in an SEM photograph, a method which generates microscopic cracks in the particle boundaries and forms a section along the microscopic cracks by repeating at about one to ten times a heat cycle of applying a temperature difference of such a small degree that no spalling may happen in the ceramic coating layer to a test sample, for example, a heat cycle of rapidly cooling a sample from 850 to 1050° C. to 200° C. and heating it from 200° C. to 850 to 1050° C., or a method which plates the particle boundaries inside the ceramic coating layer with copper (Journal of the High Temperature Institute, Vol.14, No.5, pp.78 (Sept. 1988) by Arata, Ohmori, and Ri) or impregnates them with chromic acid (Thermal Spraying, Vol.30, No. 3, Sept. 1993 by Takahashi and Senda) may be used and then a profile curve may be made.

Figure 2:
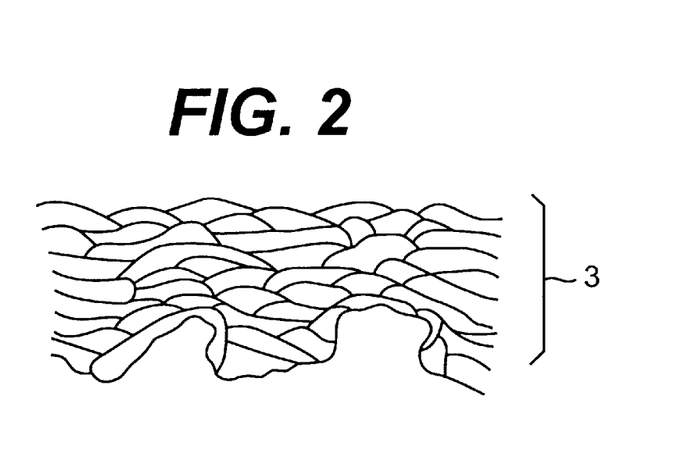
FIG. 2 is a figure schematically showing a microscopic structure of a section of a ceramic coating layer.

In a heat-resistant member having a ceramic coating layer 3, generally, a thermal stress is generated in the ceramic coating layer 3 according to difference in thermal expansion between the ceramic coating layer 3 and a metallic substrate 1 by change of the temperature where it is used, and as the result, microscopic cracks are generated in the ceramic coating layer 3. Here, FIG. 2 shows schematically a microscopic structure of a section of the ceramic coating layer. As shown in FIG. 2, the microscopic structure of the ceramic coating layer 3 is a structure in which particles of the ceramic are cohered. A microscopic crack generated in the ceramic coating layer 3 grows into a large crack as propagating and proceeding in the horizontal direction along particle boundaries between particles of the ceramic coating layer 3, and finally, spalling happens in the ceramic layer 3.

However, since in a heat-resistant member where a ceramic coating layer 3 great in roughness as described above is formed, a number of microscopic cracks are generated in the ceramic coating layer 3 while it is used in a high-temperature environment and a thermal stress is relaxed thanks to this, no spalling happens in the ceramic coating layer 3 while it is used for a long period of time, and as a result a heat resisting member having a ceramic coating layer 3 excellent in thermal fatigue resistance can be obtained.

Figure 3:
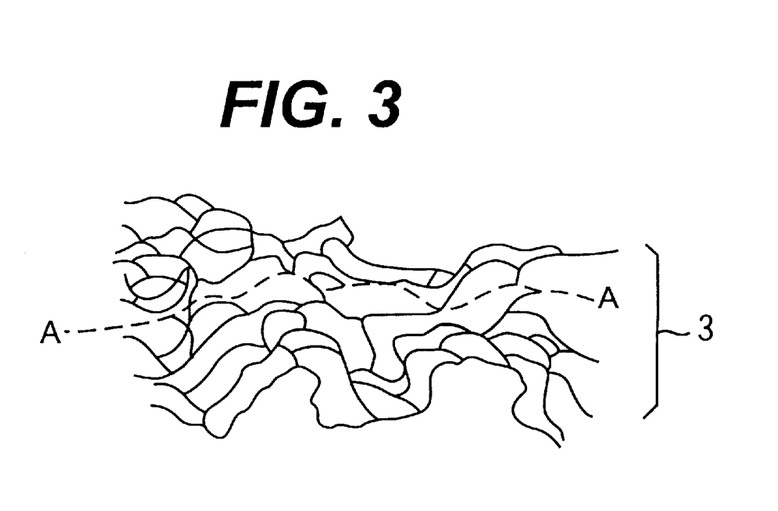
FIG. 3 is a figure showing a profile curve in a microscopic structure of a section of a ceramic coating layer.

That is to say, there are roughness parts formed along particle boundaries between particles of the ceramic in the ceramic coating layer 3, and that roughness values Rmax and Rz of the ceramic coating layer 3 become greater means that the degree of roughness formed by existence of the particles becomes greater, as illustrated by a profile curve A in FIG. 3. On the contrary, that the roughness values Rmax and Rz become smaller means that the degree of roughness comes to be smaller and closer to flatness. The present invention relaxes a thermal stress by reducing the degree of adhesion between particles forming the ceramic coating layer 3 to make microscopic cracks easy to happen through making the roughness value of the ceramic coating layer greater than a specified value, namely, making greater the degree of raggedness in the ceramic coating layer 3. As a result a heat resistant member having a ceramic coating layer 3 excellent in thermal fatigue resistance can be obtained.

It is desirable for the roughness value to be great at a position of 50 to 100 μm in depth from the surface.

From a viewpoint of an effect of relaxing a thermal stress, the greater the ceramic coating layer 3 is in roughness, the better it is, and concretely, it is preferable that the ceramic coating layer 3 is not less than 70 μm and not greater than 180 μm in Rmax, and is not less than 45 μm and not greater than 140 μm in Rz, and it is more preferable that it is not less than 80 μm and not greater than 180 μm in Rmax, and is not less than 70 μm and not greater than 140 μm in Rz, and furthermore it is still more preferable that it is not less than 120 μm and not greater than 150 μm Rmax, and is not less than 90 μm and not greater than 120 μm in Rz, and moreover it is still furthermore preferable that it is not less than 120 μm and not greater than 140 μm in Rmax, and is not less than 90 μm and not greater than 110 μm in Rz.

Moreover, it is desirable that Rmax is equal to Rz, and "0.6 Rmax≦Rz≦Rmax" is preferable from a viewpoint of improving the ceramic coating layer 3 in thermal fatigue resistance and spalling resistance, since it is possible to effectively generate microscopic cracks and relax a thermal stress in the ceramic coating layer 3.

Depending upon application, spalling and delamination are sometimes caused also by an erosion damage, and in such a case, after forming the ceramic coating layer 3 it is desirable to apply a surface smoothing process such as a polishing process to it.

And it is desirable that there are many roughness parts great in height difference, and for example in distribution of heights of roughness parts (PR) obtained from a profile curve by means of an SEM observation, it is preferable that a ceramic coating layer 3 has a total-height distribution where height of 20 μm or more occupies 30% or more, and more preferably height of 20 μm occupies 40% or more. In a ceramic coating layer 3 having a total-height distribution where height of 20 μm occupies 30% or more, a number of microscopic cracks effective for relaxing a thermal stress are generated and a ceramic coating layer 3 excellent in thermal fatigue resistance can be obtained.

Said distribution of heights of rugged parts (PR) can be obtained in the following way.

Figure 4:
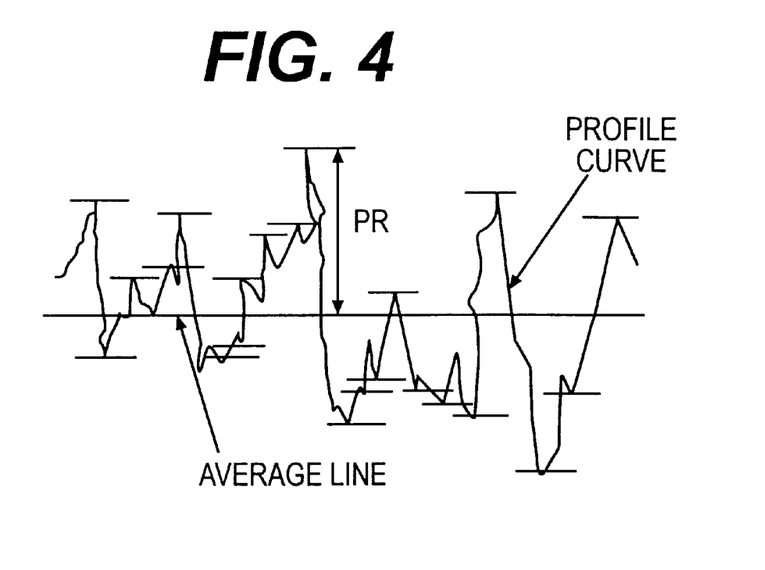
FIG. 4 is a figure showing an example of profile curves obtained by observing a ceramic coating layer with an SEM.
Figure 5:
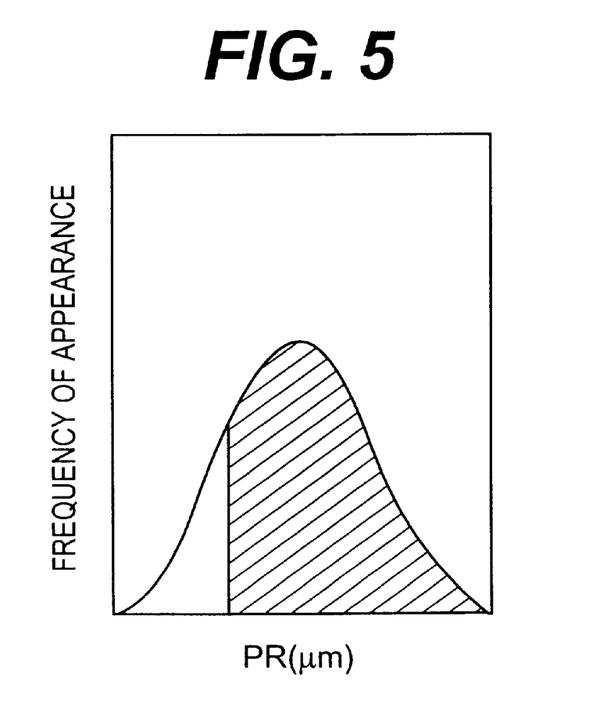
FIG. 5 is a graph showing a height distribution of rugged parts in a profile curve obtained by observing a ceramic coating layer with an SEM.

First, in a profile curve obtained from an SEM observation as shown in FIG. 4, the curve is divided into intervals of 50 μm for example, and a peak point is determined in each of the divided intervals. Next, after the average line having the average height of the respective peak points is drawn, lines each of which passes an extreme point of the rugged parts and is in parallel with said average line are drawn and a distance from each rugged part to the average line is measured, and the distance is set as height of each rugged part (PR). Next, the number of rugged parts having each height in a range of 4 mm in horizontal distance on the substrate is obtained, and a distribution curve of height of the rugged parts (PR) as shown in FIG. 5 is made. In order to form a ceramic coating layer 3, a spraying method such as a gas spraying method, a flame spraying method, an atmospheric plasma spraying method, a low-pressure plasma spraying method, and the like can be used, and a plasma spraying method is particularly suitable in case of using a ceramic material having a high melting point such as zirconia, and the plasma spraying method is preferable also in a point of making it possible to form a ceramic coating layer greater in roughness. Among the plasma spraying methods, particularly the atmospheric plasma spraying method is preferable in a point of forming a ceramic coating layer which contains a number of pores effective for relaxing a thermal stress and is excellent in spalling resistance.

Roughness of the ceramic coating layer 3 formed by such a spraying method can be adjusted by controlling such spraying conditions as a kind of gas, a spraying distance, a kind and a particle size of powder to be sprayed, a plasma current value, a plasma voltage value, and the like.

In general, argon gas, nitrogen gas and the like are used as the primary gas, and hydrogen gas, helium gas, nitrogen gas and the like are used as the secondary gas. And the gas pressure is 50 to 100 psi, the spraying distance is 70 to 150 mm, the plasma current is 600 to 1000 A, the plasma voltage is 20 to 80 v, and the plasma input power is 20 to 40 kW or so.

As powder to be sprayed, an agglomerated powder of 40 to 160 μm in particle size, an agglomerated-sintered powder of 10 to 160 μm in particle size, a fused and crushed powder of 50 to 160 μm in particle size, an agglomerated powder using fused and crushed powder of 80 to 160 μm in particle size, and the like are preferably used. The reason why the desirable particle size varies according to kinds of powder is that a repulsive force generated by collision of particles against a substrate at the time of spraying which repulsive force is required for forming a ceramic coating which is great in roughness varies in strength according to kinds of powder. In order to obtain a ceramic coating layer great in roughness, it can do to use powder large in the average particle size.

As an agglomerated powder, it is desirable to use a powder having a particle-size distribution containing 80 vol % or more particles of 44 to 100 μm in particle size.

As an agglomerated-sintered powder, it is desirable to use a powder having a particle-size distribution containing 80 vol % or more particles of 10 to 130 μm in particle size. And the average particle size of the individual minute particles forming the agglomerated-sintered powder is preferably 0.1 to 4.0 μm.

As a fused and crushed powder, it is desirable to use a powder having a particle-size distribution containing 80 vol % or more particles of 60 to 160 μm in particle size. And a powder having a particle-size distribution containing 90 vol % or more particles of 80 to 160 μm in particle size may be used which is obtained by granulating and drying and then classifying a fused and crushed powder of 0.1 to 10 μm in the average particle size. In this case, a powder which is heat-treated (sintered) after granulation may be used and a powder not heat-treated may be used. Since an additive element in a material is uniformly dispersed by performing a heat treatment (sintering), in case of using a rare earth element stabilized zirconia as a material, a ceramic coating layer more excellent in chemical stability can be obtained. In case of using a fused and crushed powder, if the powder is shaped so that its particles may be easy to divide and repulse after spraying, for example, may be polyhedral or hollow, a ceramic coating layer great in roughness can be obtained.

In case that it is necessary to obtain a ceramic coating layer excellent in chemical stability, it is desirable to use an agglomerated powder or a fused and crushed powder made of powder being as uniform as a chemical reagent, and particularly the fused and crushed powder gives a ceramic coating layer more uniform in ingredient distribution and can bring a ceramic coating layer more excellent in chemical stability.

In case of using an rare earth element stabilized zirconia, by using a fused and crushed powder, it is possible to obtain a ceramic coating layer made of a rare earth element stabilized zirconia where steam deterioration, phase delamination, and phase transition are difficult to happen. The reason is that a rare earth element stabilized zirconia is greatly influenced in its property by uniformity in distribution of the rare earth element, and the rare earth element is uniformly dispersed in the fused and crushed powder.

The ceramic coating layer 3 may be (1) a ceramic coating layer having roughness according to the invention in any profile curve in the ceramic coating layer, and may be (2) a ceramic coating layer having roughness according to the invention in some profile curves in the ceramic coating layer.

In case of a ceramic coating layer (1), since the inside roughness and the surface roughness of the ceramic coating layer are nearly equal to each other, its roughness can be evaluated with the most outside surface roughness (in conformity to JIS-B601-1982).

Such a ceramic coating layer as shown in (1) can be obtained by performing a spraying process under the same condition from the beginning to the end of formation, for example, in case of forming the ceramic coating layer by means of a spraying method.

In case of a ceramic coating layer (2), the ceramic coating layer can be obtained by changing a method or a condition for forming the ceramic coating layer in the course of formation, or continuously changing the forming condition. For example, it can be obtained by starting to form the ceramic coating layer by means of a spraying method and changing its spraying condition in the course of it, or changing the forming method from the spraying method to a CVD method or a PVD method. On the contrary to a ceramic coating layer formed by a uniform method or condition, such a ceramic coating layer can be also obtained by performing a surface treatment such as a surface polishing process or a laser process.

Figure 6:
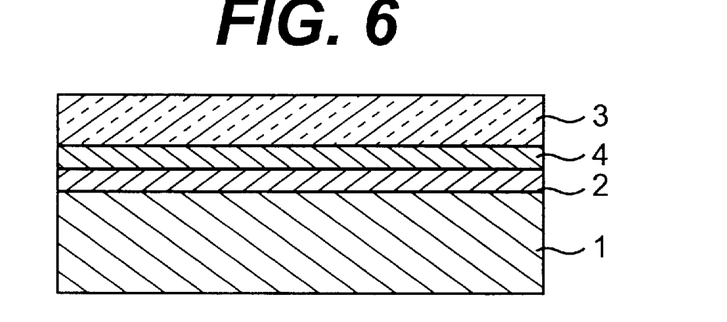
FIG. 6 is a sectional view schematically showing structure of another embodiment of a first heat-resistant member of the invention.

In the present invention, a structure may be also adopted where a ceramic coating layer 4 which is less than 70 μm in Rmax of profile curves and is less than 45 μm in Rz is provided between the metal bonding layer 2 and the ceramic coating layer 3 which is not less than 70 μm in Rmax of profile curves and is not less than 45 μm in Rz in said embodiment.

In such a way, a heat-resistant member can be improved more greatly in life by forming a ceramic coating layer 4 small in roughness on the metallic substrate 1 side.

That is to say, since there is a strong adhesive force between individual particles in the ceramic coating layer 4 small in roughness, occurrence and progress of cracks generated inside the ceramic coating layer 4 by a thermal stress are suppressed, and spalling or delamination in the ceramic coating layer which has been caused by those cracks can be suppressed.

On the other hand, in case that the ceramic coating great in roughness is formed directly on the metallic substrate 1 or the metal bonding layer 2, although a thermal stress is relaxed, since the stress is great directly on the metallic member, it is sometimes difficult to suppress occurrence and progress of cracks to cause spalling or delamination in the ceramic coating layer 3.

In case of forming a ceramic coating layer out of the ceramic coating layer 4 small in roughness, for example, in a heat-resistant member requiring a thick ceramic coating layer of 250 μm or more in thickness such as a heat-resistant member for a gas turbine or an engine, spalling or delamination is liable to happen due to its great thickness. In a heat resistant member to be used in a gas turbine or an engine, particularly in a heat-resistant member to be used for a part to be exposed to a high temperature, a ceramic coating layer for the purpose of heat isolation needs to be 250 μm or more in thickness under the necessity of having a proper thermal slope. The ceramic coating layer 4 small in roughness aims at suppressing occurrence and progress of cracks to cause spalling or delamination in the ceramic coating layer by strengthening adhesion between individual particles through making its roughness small, and a stress acting on itself increases with the increase of its film thickness and when the thickness exceeds 230 μm depending upon a condition of using it, ordinarily, the ceramic coating layer comes to be liable to exfoliate to an extreme. Therefore, the ceramic coating layer 4 small in roughness is limited to 230 μm in thickness, and is desirably 100 μm or less, and more desirably 50 μm or less. Accordingly, it is difficult for the ceramic coating layer 4 alone to form a ceramic coating layer having a heat isolation effect and having neither spalling nor delamination generated, and the ceramic coating layer 4 alone is unsuitable particularly for forming a ceramic coating layer 250 μm or more in thickness.

However, a ceramic coating layer 4 being less than 1 μm in thickness gives hardly an effect of its existence, and accordingly, the ceramic coating layer 4 is preferably 1 to 230 μm in thickness and more preferably 20 to 150 μm, and furthermore preferably 20 to 100 μm, and thus it is possible to obtain a ceramic coating layer having neither spalling nor delamination generated for a long time even in a very high-temperature atmosphere.

The smaller the ceramic coating layer 4 is in roughness, the better it is, and at least it is preferable to make the roughness of the metal bonding layer 2 smaller by 20 μm or more in Rmax and by 10 μm or more in Rz. The reason is that roughness of the metal bonding layer 2 has a great effect upon roughness of the ceramic coating layer 4. Therefore, for example, in case that roughness of the metal bonding layer 2 is 90 μm in Rmax and 60 μm in Rz, roughness of the ceramic coating layer 4 is preferably 70 μm or less in Rmax and 50 μm or less in Rz, and more preferably 50 μm or less in Rmax and 40 μm or less in Rz, and furthermore preferably 40 μm or less in Rmax and 35 μm or less in Rz.

Although it is desirable that there are a number of rugged parts great in height difference inside the ceramic coating layer 3, it is desirable that there are a number of rugged parts small in height difference inside the ceramic coating layer 4 small in roughness, and for example in the whole height distribution of height of rugged parts (PR) obtained from a profile curve by an SEM observation, height of 20 μm or less occupies preferably 50% or more, and more desirably 70% or more. A ceramic costing layer 4 in which height of 20 μm or less occupies 50% or more in the whole height distribution can effectively suppress occurrence and progress cracks to cause spalling or delamination.

In forming the ceramic coating layer 4, the same method as described in case of the ceramic coating layer 3 can be used, and the ceramic coating layer 4 can be formed by properly selecting such a method and a condition that the surface roughness of the coated layer may be less than 70 μm in the maximum height Rmax of profile curves and less than 45 μm in the 10-point average roughness Rz.

In case of using a spraying method, it is desirable particularly to use an agglomerated powder of 1 to 60 μm in particle size, a fused and crushed powder of 1 to 100 μm in particle size, an agglomerated powder with using fused and crushed powder of 1 to 100 μm in particle size, or the like. It is desirable to use powder being as fine as possible in these powder and it is more desirable to use a powder containing a comparatively more amount of fine particles. Powder of 1 μm in particle size is poor in an adhesion ratio by spraying.

It is desirable to use an agglomerated powder of 10 to 50 μm in particle size, a fused and crushed powder of 5 to 50 μm in particle size, and an agglomerated powder with using fused and crushed powder of 10 to 30 μm in particle size, and particularly the fused and crushed powder is preferable in a point that it can form a ceramic coating layer small in roughness.

Similarly to the ceramic coating layer 3, the ceramic coating layer 4 also may be (1) a ceramic coating layer having roughness according to the invention in any profile curve in the ceramic coating layer, and may be (2) a ceramic coating layer having roughness according to the invention in some profile curves in the ceramic coating layer.

In case of a ceramic coating layer (1), since the inside roughness and the surface roughness of the ceramic coating layer are nearly equal to each other, its roughness can be evaluated with the surface roughness (in conformity to JIS-2601-1982).

Figure 7:
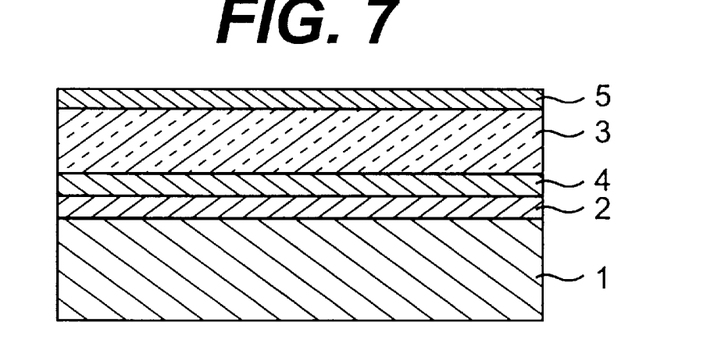
FIG. 7 is a sectional view schematically showing structure of a further other embodiment of a first heat-resistant member of the invention.

In the invention, as shown in FIG. 7, a ceramic coating layer 5 small in roughness which is less than 70 μm in Rmax of profile curves and less than 45 μm in Rz may be provided also on the ceramic coating layer 3 which is not less than 70 μm in Rmax of profile curves and not less than 45 μm in Rz. A heat-resistant member is improved in erosion resistance by providing such a ceramic coating layer 5 on the outermost layer of it. The ceramic coating layer 5 is desirably 1 to 50 μm in thickness and more desirably 1 to 20 μm. When the thickness exceeds 50 μm, a thermal stress acting on the whole ceramic coating layer becomes great and the ceramic coating layers 3 and 4 which are the lower layers come to be liable to exfoliate. On the contrary, when the thickness is less than 1 μm, the heat resistant member becomes insufficient in erosion resistance.

An embodiment of another heat-resistant member of the present invention is described in the following.

Figure 8:
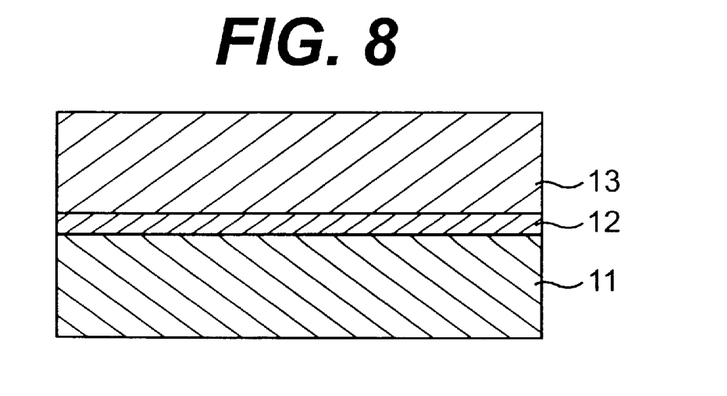
FIG. 8 is a sectional view schematically showing structure of an embodiment of a second heat-resistant member of the invention.
Figure 9:
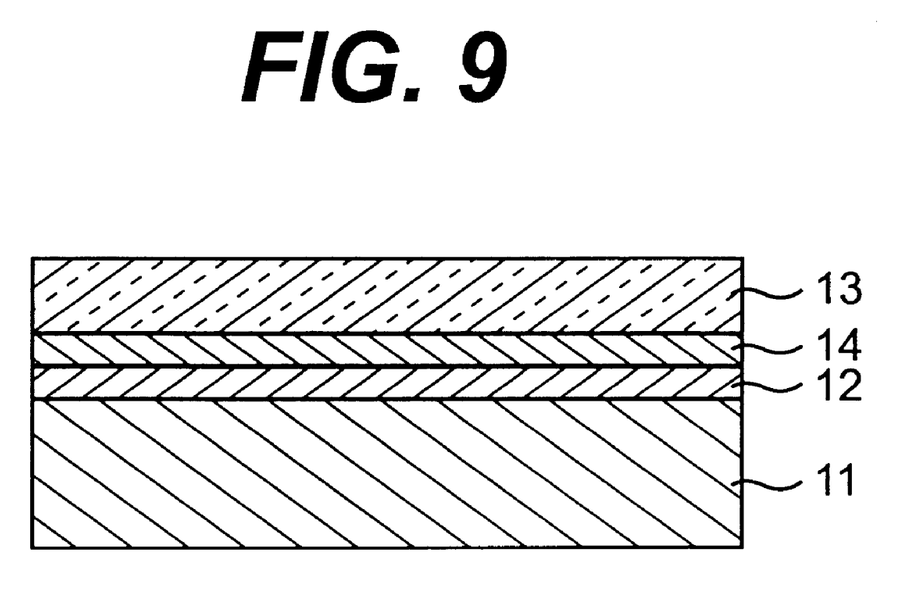
FIG. 9 is a sectional view schematically showing structure of another embodiment of a second heat-resistant member of the invention.

FIG. 8 is a sectional view schematically showing structure of an embodiment of another heat-resistant member of the invention, and FIG. 9 is a sectional view schematically showing structure of another embodiment of another heat resistant member of the invention.

In FIG. 8, reference number 11 is a metallic substrate, and on the metallic substrate 11, a metal bonding layer 12 and a low-hardness ceramic coating layer 13 being less than 650 HV in Vickers hardness are formed one after another.

In FIG. 9, a high-hardness ceramic coating layer 14 being not less than 650 HV in Vickers hardness is formed between said metal bonding layer 12 and said low-hardness ceramic coating layer 13 being less than 650 HV in Vickers hardness.

The Vickers hardness defining the ceramic coating layers 13 and 14 in this case is the average value of hardness values obtained by measuring them as applying a load of 200 g to them for 30 seconds at each of different 10 or more points, and the measuring point may be on the surface and in an intermediate part of a section. In case of measuring the hardness in an intermediate part of a section, it is desirable to measure it at a position about 50 to 100 μm distant from the surface of the metal bonding layer 12.

Said metallic substrate 11 and said metal bonding layer 12 are in detail similar to said embodiment.

As a material for the ceramic coating layers 13 and 14, it is desirable to use a material of at least one kind selected from ceramic materials great in hardness, for example, alumina, titanium oxide, stabilized zirconia, rare earth oxides, magnesium oxide, spinel and the like, and particularly, it is desirable to use a material of at least one kind selected from alumina, titanium oxide, and stabilized zirconia each of which has a high melting point. Furthermore, it is more desirable to use the stabilized zirconia which has a high hardness and a great thermal expansion coefficient.

In case of making the ceramic coating layer of stabilized zirconia, in the same way as said embodiment, it is desirable to make it of the zirconia of 90 vol % or more in tetragonal phase and it is desirable that the composition of a stabilizing element dissolved in solid is 4.0 to 28.0 mol %.

It is preferable that the low-hardness ceramic coating layer 13 uses a material of at least one kind selected from said alumina, titanium oxide, and stabilized zirconia and is formed as controlling its layer structure, since the low-hardness ceramic coating layer 13 formed in such a way can stably exist when it is kept in a high temperature for a long time.

In a heat-resistant member having a ceramic coating layer of a two-layered structure of a low-hardness ceramic coating layer 13 and a high-hardness ceramic coating layer 14, the two layers may be equal to or different from each other in composition, but in case that they are different in composition, it is desirable to select materials which do not generate a low melting point substance by reacting upon each other between the two layers when they are used in a high-temperature atmosphere. This point is the same as said embodiment.

In forming the ceramic coating layers 13 and 14, a spraying method, an EB-PVD method, a CVD method, a sputtering method and the like can be used, and a spraying method, particularly, plasma-spray method is suitable from a viewpoint of working efficiency.

Hardness of the layers can be controlled, for example, by adjusting such spraying conditions as the particle-size distribution and a spraying gun distance in case of using a spraying method, or by adjusting a substrate heating temperature in case of using an EB-PVD method.

Concretely, a low-hardness ceramic coating layer 13 is preferably formed by using powder large in particle size by means of a spraying method, and a fused and crushed powder of 40 to 100 μm in particle size, an agglomerated powder of 10 to 100 μm in particle size, an agglomerated-sintered powder of 10 to 100 μm in particle size and the like are preferably used since they bring a low-hardness ceramic coating layer. And as a spraying method, an atmospheric plasma spraying method and a low-pressure plasma spraying method are preferable, and among them an atmospheric plasma spraying method is more preferable.

And in case of using a spraying method to form a high-hardness ceramic coating layer 14, it is preferable to use an agglomerated powder or a fused and crushed powder, or it is more preferable to use a fused and crushed powder being as small as possible in particle size, for example, a fused and crushed powder of 10 to 50 μm in particle size, since a high-hardness ceramic coating layer 14 can be obtained. It is more preferable to use a powder which is small in particle-size distribution. As a spraying method, a plasma spraying method and an HVOF method are preferable, and as a plasma spraying method, a low-pressure plasma spraying method is more preferable.

Since a low-hardness ceramic coating layer 13 less than 500 HV in Vickers hardness is easy to have microscopic cracks formed in the ceramic coating layer 13 when it is used in a high-temperature environment and is excellent in relaxation of a thermal stress, the low-hardness ceramic coating layer 13 can give a heat-resistant member having a ceramic coating layer 13 excellent in thermal fatigue resistance.

However, in case of forming such a low-hardness ceramic coating layer 13 directly on the metallic substrate 11 or the metal bonding layer 12, since a great thermal stress caused by difference in thermal expansion coefficient between the metallic member and the ceramic coating layer 13 happens, it is sometimes difficult to suppress occurrence and progress of cracks to cause spalling or delamination of the ceramic coating layer 13. A high-hardness ceramic coating layer 14 being not less than 650 HV in Vickers hardness is effective to suppress occurrence and progress of cracks directly on such metallic members, and a heat-resistant member more excellent in thermal fatigue resistance can be obtained by providing such a high-hardness ceramic coating layer 14 of 650 HV or more in Vickers hardness between a low-hardness ceramic coating layer 13 and the metallic member.

On the other hand, in case of only a high-hardness ceramic coating layer 14, in the same way as a ceramic coating layer 4 small in roughness in said embodiment, spalling or delamination to be caused by a thermal stress is extremely liable to happen inside the layer when its film thickness exceeds 230 μm. Accordingly, the high-hardness ceramic coating layer 14 also is preferably 1 to 230 μm in thickness, more preferably 20 to 150 μm in thickness, and furthermore preferably 20 to 100 μm in thickness. And it can do to fill the remaining thickness necessary for having a heat isolation effect with the low-hardness ceramic coating layer 13.

In this embodiment, a ceramic coating layer of high hardness may be provided on said low-hardness ceramic coating layer 13. The heat-resistant member is improved in erosion resistance by providing a high-hardness ceramic coating layer of about 1 to 50 μm in thickness, or preferably about 1 to 20 μm in thickness on the ceramic coating layer 13. Its erosion resistance can be improved also by performing a surface treatment such as a surface polishing process or a laser process after forming the ceramic coating layer 13.

A method for evaluating quality of a heat-resistant member of the present invention in the following.

As described above, roughness and hardness of a ceramic coating layer in a heat-resistant member having the ceramic coating layer are important parameters for evaluating its thermal fatigue resistance. Accordingly, it is possible to obtain good reliability and excellent performance in thermal fatigue resistance on a ceramic coating layer and, thanks to it, obtain a heat resistant member capable of keeping its heat resistance for a long time by measuring the surface roughness or the hardness of the ceramic coating layer and controlling the manufacturing process so that the measured values may be in a specified range, after applying the ceramic coating layer to the heat resistant member or in the middle of applying the ceramic coating layer to the heat-resistant member.

Concrete examples of the invention are described in the following.

EXAMPLE 1

A metal bonding layer of 150 μm in thickness composed of Ni, Co, Cr, Al, and Y (composition: 23Co—18Cr—12Al—0.3Y—bal.Ni) was formed by a plasma spraying method on a metallic substrate composed of an Ni-based superalloy IN738LC of 30 mm×30 mm×3 mm (composition: 61Ni—16Cr—8.5Co—3.4Al—1.7Mo—2.6W—1.7Ta—0.9Nb—3.4Ti). Measuring the surface roughness of the metal bonding layer immediately after forming it, it was 72 μm in Rmax and 53 μm in Rz. Next, a test piece was made by forming a ceramic coating layer of 280 μm in thickness on the metal bonding layer by plasma-spraying an agglomerated powder of 44 to 120 μm in particle size composed of stabilized zirconia containing $Y_2O_3$ of 8 wt %.

EXAMPLE 2

A test piece was made in the same way as the example 1 except using an agglomerated powder of 10 to 100 μm in particle size as a material for the ceramic coating layer.

COMPARATIVE EXAMPLE 1

A test piece was made in the same way as the example 1 except using a fused and crushed powder of 10 to 44 μm in particle size as a material for the ceramic coating layer.

COMPARATIVE EXAMPLE 2

A test piece was made in the same way as the example 1 except using an agglomerated powder of 10 to 44 μm in particle size as a material for the ceramic coating layer.

COMPARATIVE EXAMPLE 3

A metal bonding layer of 150 μm in thickness composed of Ni, Co, Cr, Al, and Y (composition; 23Co—18Cr—12Al—0.3Y— bal.Ni) was formed by a plasma spraying method on a metallic substrate similar to the example 1. Measuring the surface roughness of the metal bonding layer immediately after forming it, it was 40 μm in Rmax and 30 μm in Rz. Then, a test piece was made by forming a ceramic coating layer of 280 μm in thickness on the metal bonding layer by plasma-spraying an agglomerated powder of 5 to 30 μm in particle size composed of stabilized zirconia containing $Y_2O_3$ of 8 wt %.

After measuring surface roughness and taking an SEM photograph of the ceramic coating layer of each obtained test piece and drawing its profile curve, its Rmax, Rz, and PR distribution were obtained.

And after performing a thermal fatigue test on each test piece (repeating a cycle of keeping it at 1000° C. continuously for 1 hour and at 150° C. continuously for 1 hour), it was checked whether or not there was any delamination in the ceramic layer. The result is shown in Table 1.

TABLE 1

| Roughness | Example 1 SEM | * | Example 2 SEM | * | Comparative example 3 SEM | * | Comparative example 4 SEM | * | Comparative example 5 SEM | * |
|---|---|---|---|---|---|---|---|---|---|---|
| Rmax($\mu$m) | 70 | 85 | 100 | 110 | 65 | 62 | 68 | 68 | 68 | 67 |
| Rz($\mu$m) | 60 | 58 | 73 | 81 | 42 | 38 | 38 | 32 | 40 | 42 |
| PR distribution(%) | 35 | | 43 | | 25 | | 20 | | 20 | |
| Thermal fatigue test (number of heat cycles) | >5000 | | >6000 | | 1200 | | 800 | | 250 | |

*Surface roughness

EXAMPLE 3

A metal bonding layer of 150 $\mu$m in thickness composed of Ni, Co, Cr, Al, and Y (composition: 23Co—18Cr—12Al—0.3Y—bal.Ni) was formed by a plasma spraying method on a metallic substrate composed of an Ni-based superalloy IN738LC of 30 mm×30 mm×3 mm (composition; 61Ni—16Cr—8.5Co—3.4Al—1.7Mo—2.6W—1.7Ta—0.9Nb—3.4Ti). Measuring the surface roughness of the metal bonding layer immediately after forming it, it was 72 $\mu$m in Rmax and 53 $\mu$m in Rz. Next, a test piece was made by forming a first ceramic layer of 120 $\mu$m in thickness on the metal bonding layer by plasma-spraying a fused and crushed powder of 10 to 44 $\mu$m in particle size composed of stabilized zirconia containing $Y_2O_3$ of 8 wt %, forming a second ceramic layer of 150 $\mu$m in thickness on the first ceramic layer by plasma-spraying an agglomerated-sintered powder of 10 to 88 $\mu$m in particle size composed of stabilized zirconia containing $Y_2O_3$ of 8 wt %, and then furthermore forming a third ceramic layer of 20 $\mu$m in thickness on the second ceramic layer by plasma-spraying a fused and crushed powder of 10 to 44 $\mu$m in particle size composed of stabilized zirconia containing $Y_2O_3$ of 8 wt %.

EXAMPLE 4

After a metal bonding layer was formed on a metallic substrate in the same way as example 3, a first ceramic layer of 130 $\mu$m in thickness was formed on the metal bonding layer by plasma spraying an agglomerated powder of 10 to 44 $\mu$m in particle size composed of stabilized zirconia containing $Y_2O_3$ of 8 wt %. Next a second ceramic layer of 150 $\mu$m in thickness was formed on the first ceramic layer by plasma-spraying an agglomerated-sintered powder of 10 to 100 $\mu$m in particle size having the same composition. Finally a test piece was made by forming a third ceramic layer of 50 $\mu$m in thickness on the second ceramic layer by plasma-spraying a fused and crushed powder of 10 to 44 $\mu$m in particle size having the same composition.

EXAMPLE 5

After a metal bonding layer was formed on a metallic substrate in the same way as example 3, a first ceramic layer of 90 $\mu$m in thickness was formed on the metal bonding layer by spraying a fused and crushed powder of 10 to 25 $\mu$m in particle size composed of stabilized zirconia containing $Y_2O_3$ of 8 wt %. Next, a second ceramic layer of 150 $\mu$m in thickness was formed on the first ceramic layer by plasma-spraying an agglomerated and sintered powder of 10 to 88 $\mu$m in particle size having the same composition, and finally a ceramic layer of 20 $\mu$m in thickness was formed on the second ceramic layer by plasma spraying a fused and crushed powder of 10 to 44 $\mu$m in particle size having the same composition. And then a test piece was made by polishing the surface of the third ceramic layer to 10 $\mu$m or less in the surface roughness Rmax.

EXAMPLE 6

After a metal bonding layer was formed on a metallic substrate in the same way as example 3, a first ceramic layer of 120 $\mu$m in thickness was formed on the metal bonding layer by plasma spraying an agglomerated powder of 10 to 30 $\mu$m in particle size composed of stabilized zirconia containing $Y_2O_3$ of 8 wt %. Next, a second ceramic layer of 150 $\mu$m in thickness was formed on the first ceramic layer by plasma-spraying fused and crushed powder of 50 to 100 $\mu$m in particle size having the same composition, and finally a third ceramic layer of 30 $\mu$m in thickness was formed on the second ceramic layer by spraying a fused and crushed powder of 10 to 44 $\mu$m in particle size having the same composition. And then a test piece was made by polishing the surface of the third ceramic layer to 10 $\mu$m or less in the surface roughness Rmax.

EXAMPLE 7

After a metal bonding layer was formed on a metallic substrate in the same way as example 1, a test piece was made by forming a ceramic layer of 280 $\mu$m in thickness on the metal bonding layer by spraying an agglomerated and sintered powder of 10 to 88 $\mu$m in particle size composed of stabilized zirconia containing $Y_2O_3$ of 8 wt %.

EXAMPLE 8

The surface of the ceramic layer of the example 7 was polished to 10 $\mu$m or less in the surface roughness Rmax.

EXAMPLE 9

After a metal bonding layer was formed on a metallic substrate in the same way as example 1, a first ceramic layer of 150 $\mu$m in thickness was formed on the metal bonding layer by plasma spraying an agglomerated powder of fused and crushed powder of 10 to 30 $\mu$m in particle size composed of stabilized zirconia containing $Y_2O_3$ of 8 wt %. Next an agglomerated-sintered powder of 10 to 88 $\mu$m in particle size composed of stabilized zirconia containing $Y_2O_3$ of 8 wt % and an agglomerated powder of 1 to 40 μm in particle size having the same composition were plasma-sprayed onto the first ceramic layer. At this time, a second ceramic layer of 280 μm in thickness having a slope in ingredient density was made by using a more amount of an agglomerated-sintered powder near the first ceramic layer and using a more amount of an agglomerated powder near the surface.

EXAMPLE 10

The surface of the ceramic layer of the example 9 was polished to 10 μm or less in the surface roughness Rmax.

EXAMPLE 11

After a metal bonding layer was formed on a metallic substrate in the same way as example 3, a first ceramic layer of 150 μm in thickness was formed on the metal bonding layer by plasma spraying an agglomerated powder of 10 to 60 μm in particle size composed of stabilized zirconia containing $Y_2O_3$ of 8 wt %. Next, a first ceramic layer of 100 μm in thickness was formed by plasma spraying an agglomerated-sintered powder in 10 to 100 μm in particle size on the first ceramic layer, and finally a third ceramic layer of 25 μm in thickness was formed on the second ceramic layer by spraying a fused and crushed powder of 10 to 44 μm in particle size having the same composition. And then the surface of the third ceramic layer was polished to 10 μm or less in the surface roughness Rmax.

EXAMPLE 12

After a metal bonding layer was formed on a metallic substrate in the same way as example 3, a first ceramic layer of 120 μm in thickness was formed on the metal bonding layer by spraying a fused and crushed powder of 5 to 25 μm in particle size composed of stabilized zirconia containing $Y_2O_3$ of 8 wt %. Next, a second ceramic layer of 150 μm in thickness was formed on the first ceramic layer by plasma spraying an agglomerated-sintered powder of 10to 88 μm in particle size having the same composition, and finally a third ceramic layer of 30 μm in thickness was formed on the second ceramic layer by spraying a fused and crushed powder of 10 to 44 μm in particle size having the same composition. And then the surface of the third ceramic layer was polished to 10 μm or less in the surface roughness Rmax.

After measuring roughness of each ceramic layer which was sprayed with each powder taking SEM photographs of the test pieces of the examples 3 to 5, the Rmax and Rz of the respective ceramic layers were measured. And the test pieces whose surfaces were polished were measured in their surface roughness.

A thermal fatigue test and an erosion test were performed on each test piece of the examples 3 to 12. In these test, the test pieces were placed inside an electric furnace and a cycle of continuously keeping them at 1000° C. for 1 hour and at 150° C. for 1 hour as making an SiC powder of 0.5 to 10 μm in particle size at a flow rate of 50 m/s in the electric furnace was repeated and then it was observed whether or not spalling of each ceramic layer of them and damage of the surface of each of them happened. The result is shown in Table 2.

For comparison with the invention, the same tests were performed on said comparative examples 1 to 3. The result was shown together in Table 2.

TABLE 2

|   |   | Roughness of the first layer[1] | Roughness of the second layer[1] | Roughness of the third layer[1] | Surface roughness of the outermost layer[1] | Thermal fatigue test (number of heat cycles) | Erosion test (number of heat cycles) |
|---|---|---|---|---|---|---|---|
| | | | | | Example | | |
| 3 | Rmax | 58 | 73 | 45 | — | >2000 | 1500~1800 |
|   | Rz | 32 | 48 | 23 | — | | |
| 4 | Rmax | 40 | 95 | 37 | — | >2000 | >8000 |
|   | Rz | 31 | 60 | 19 | — | | |
| 5 | Rmax | 48 | 95 | 50 | 2 | >2000 | >2000 |
|   | Rz | 33 | 62 | 34 | 1.0 | | |
| 6 | Rmax | 44 | 87 | 48 | 4 | >8000 | 1800~2000 |
|   | Rz | 32 | 57 | 33 | 1.3 | | |
| 7 | Rmax | | 100 | | — | >2000 | 600~1000 |
|   | Rz | | 63 | | — | | |
| 8 | Rmax | | 113 | | 3 | >2000 | 600~1000 |
|   | Rz | | 75 | | 1.5 | | |
| 9 | Rmax | 49 | 115[2] | 45[3] | — | >2000 | >1800 |
|   | Rz | 30 | 80[2] | 23[3] | — | | |
| 10 | Rmax | 52 | 113[2] | 41[3] | 2 | >2000 | >2000 |
|   | Rz | 31 | 18[2] | 21[3] | 1.0 | | |
| 11 | Rmax | 46 | 98 | 44 | — | >2000 | 1800~2000 |
|   | Rz | 30 | 75 | 21 | — | | |
| 12 | Rmax | 36 | 115 | 38 | 4 | >2000 | >2000 |
|   | Rz | 24 | 89 | 20 | 2.1 | | |
| | | | | | Comparative example | | |
| 1 | Rmax | | 65 | — | — | 80 (Spalling happened in the layer) | Unmeasurable (No damage on the surface) |
|   | Rz | | 42 | — | — | | |
| 2 | Rmax | | 68 | — | — | 300 (A part of | Unmeasurable |

TABLE 2-continued

|   | | Roughness of the first layer*[1] | Roughness of the second layer*[1] | Roughness of the third layer*[1] | Surface roughness of the outermost layer*[1] | Thermal fatigue test (number of heat cycles) | Erosion test (number of heat cycles) |
|---|---|---|---|---|---|---|---|
|   | Rz | | 38 | — | — | the layer exfoliated) | (Many great damages appeared on the surface) |
| 3 | Rmax | | 68 | — | — | 500 (A part of the layer exfoliated) | Unmeasurable (Many great damages appeared on the surface) |
|   | Rz | | 40 | | | | |

*[1]Unit is μm
*[2]Roughness at a position 50 μm distant from the surface of the first ceramic layer
*[3]Roughness at a position 50 μm distant from the surface of the second ceramic layer

EXAMPLE 13

A metal bonding layer of 150 μm in thickness composed of Ni, Co, Cr, Al, and Y (composition: 23Co—18Cr—12Al—0.3Y—bal.Ni) was formed by a plasma spraying method on a metallic substrate composed of an Ni-based superalloy IN738LC (composition: 61Ni—16Cr—8.5Co—3.4Al—1.7Mo—2.6W—1.7Ta—0.9Nb—3.4Ti). Measuring the surface roughness of the metal bonding layer immediately after forming it, it was 78 μm in Rmax and 58 μm in Rz. Next, a ceramic layer of 120 μm in thickness was formed on the metal bonding layer by plasma-spraying a fused and crushed powder of 5 to 40 μm in particle size composed of stabilized zirconia containing $Y_2O_3$ of 8 wt %. Measuring the surface roughness of the ceramic layer immediately after forming it, it was 50 μm in Rmax and 38 μm in Rz. After this, furthermore a test piece was made by forming a ceramic layer of 150 μm in thickness on that ceramic layer by atmospheric plasma-spraying an agglomerated-sintered powder of 10 to 50 μm in particle size composed of the same composition. Measuring the surface roughness of the ceramic layer immediately after forming it, it was 98 μm in Rmax and 78 μm in Rz.

EXAMPLES 14 TO 19 AND COMPARATIVE EXAMPLES 4 TO 6

Test pieces were made in the same way as the example 13 except changing powder to be sprayed for forming the respective ceramic layers as shown in Table 4.

After drawing a profile curve from an SEM photograph of each of the test pieces obtained in the examples 14 to 21 and the comparative example 4, the roughness values Rmax and Rz and the PR distribution of each ceramic layer were measured. And after performing a thermal fatigue test of repeating a heat cycle of keeping the test pieces at 1100° C. for 30 minutes and at the room temperature for 30 minutes, it was checked whether or not there was any delamination in each ceramic layer. The result is shown in Table 3. The result of the thermal fatigue test is shown by the number of the heat cycles performed until delamination happened in each ceramic layer. And the roughness values Rmax and Rz of each ceramic layer obtained from each profile curve were nearly equal to the Rmax and Rz obtained from the surface roughness measured when forming the ceramic layer on each test piece.

TABLE 3

| | Example | | | | | | | Comparative example | | |
|---|---|---|---|---|---|---|---|---|---|---|
| | 13 | 14 | 15 | 16 | 17 | 18 | 19 | 4 | 5 | 6 |
| | Sprayed powder | | | | | | | | | |
| Lower layer (Particle size: μm) | Fused and crushed powder (5~40) | Agglomerated powder (1~40) | Fused and crushed powder (1~25) | Fused and crushed powder (1~35) | Fused and crushed powder (30~50) | Agglomerated-sintered powder (40~100) | Agglomerated-sintered powder (60~100) | Agglomerated-sintered powder (10~25) | Agglomerated powder (10~25) | Fused crushed powder (10~25) |
| Upper layer (Particle size: μm) | Agglomerated-sintered powder of 10 to 40 | Agglomerated powder (60~100) | Agglomerated-sintered powder (10~100) | Fused and crushed powder (50~100) | Agglomerated powder (60~100) | Agglomerated powder (60~100) | Agglomerated powder (60~88) | Fused and crushed powder (10~30) | Agglomerated powder (10~30) | Fused and crushed powder (20~50) |
| | Roughness | | | | | | | | | |
| Lower layer | | | | | | | | | | |
| Rmax(μm) | 50 | 63 | 38 | 42 | 45 | 74 | 78 | 85 | 53 | 42 |
| Rz(μm) | 38 | 45 | 32 | 35 | 32 | 61 | 65 | 74 | 32 | 32 |
| PR(%) | 63*[1] | 52*[1] | 73*[1] | 70*[1] | 65*[1] | 30*[2] | 31*[2] | 15*[2] | 10*[2] | 65 |
| Upper | | | | | | | | | | |

TABLE 3-continued

|  | Example | | | | | | | Comparative example | | |
|---|---|---|---|---|---|---|---|---|---|---|
|  | 13 | 14 | 15 | 16 | 17 | 18 | 19 | 4 | 5 | 6 |
| layer |  |  |  |  |  |  |  |  |  |  |
| Rmax(μm) | 98 | 85 | 93 | 124 | 98 | 85 | 97 | 42 | 48 | 45 |
| Rz(μm) | 78 | 68 | 88 | 93 | 88 | 66 | 74 | 39 | 31 | 35 |
| PR(%) | 53*2 | 40*2 | 48*2 | 60*2 | 55*2 | 38*2 | 45*2 | 15*2 | 27*2 | 10*2 |
| Thermal fatigue test (number of heat cycles) | >2000 | >2000 | >2000 | >2000 | >2000 | 1800 | 1750 | 500 | 650 | 15 |

*1Population of PR which is less than 20 μm.
*2Population of PR which is equal to or greater than 20 μm.

EXAMPLE 20

A metal bonding layer of 150 am in thickness composed of Ni, Co, Cr, Al, and Y (composition: 23Co—18Cr—12Al—0.3Y—bal.Ni) was formed by a plasma spraying method on a metallic substrate composed of an Ni-based superalloy IN738LC (composition; 61Ni—16Cr—8.5Co—3.4Al—1.7Mo—2.6W—1.7Ta—0.9Nb—3.4Ti). Measuring the surface roughness of the metal bonding layer immediately after forming it, it was 78 μm in Rmax and 58 μm in Rz. Next, a ceramic layer of 30 μm in thickness was formed on the metal bonding layer by plasma-spraying a fused and crushed powder of 5 to 40 μm in particle size composed of alumina. Measuring Vickers hardness of the surface of the ceramic layer immediately after forming it, it was 700 HV (at a load of 200 g).

After this, a test piece was made by forming a ceramic layer of 250 μm in thickness on that ceramic layer by atmospheric plasma-spraying an agglomerated-sintered powder of 10 to 50 μm in particle size composed of zirconia 8YZ containing $Y_2O_3$ of 8 wt % on that ceramic layer. Measuring Vickers hardness of the surface of this ceramic layer immediately after forming it, it was 480 HV (at a load of 200 g).

EXAMPLES 21 TO 26 AND COMPARATIVE EXAMPLES 7 TO 9

Test pieces were made in the same way as the example 20 except changing powder to be sprayed for forming the respective ceramic layers as shown in Table 4.

After applying a process of cutting, burying and polishing to the respective test pieces obtained in the examples 20 to 26 and comparative examples 7 to 9, Vickers hardness values of each ceramic layer were measured from its sectional direction. And after performing a thermal fatigue test of repeating a heat cycle of keeping the test pieces at 1150° C. for 30 minutes and at the room temperature for 30 minutes, it was checked whether or not there was any delamination in each ceramic layer. The result is shown in Table 4. The result of the thermal fatigue test is shown by the number of the heat cycles performed until delamination happened in each ceramic layer. And the said Vickers hardness values were nearly equal to the Vickers hardness values obtained by measuring when forming the ceramic layer on each test piece.

TABLE 4

|  | Example | | | | | | | Comparative example | | |
|---|---|---|---|---|---|---|---|---|---|---|
|  | 20 | 21 | 22 | 23 | 24 | 25 | 26 | 7 | 8 | 9 |
|  | Sprayed powder | | | | | | | | | |
| Lower layer (Particle size: μm) | Alumina fused and crushed powder (5~40) | Alumina agglomerated powder (1~35) | Alumina fused and crushed powder (1~25) | Alumina fused and crushed powder (1~30) | Alumina fused and crushed powder (5~20) | Alumina agglomerated-sintered powder (50~120) | Alumina fused and crushed powder (70~100) | Alumina agglomerated sintered powder (10~40) | Alumina fused and crushed powder (10~25) | Alumina agglomerated powder (10~25) |
| Upper layer (Particle size: μm) | Zirconia agglomerated sintered powder (10~50) | Zirconia agglomerated powder (70~110) | Zirconia agglomerated-sintered powder (10~90) | Zirconia fused and crushed powder (50~120) | Zirconia agglomerated powder (80~120) | Zirconia agglomerated powder (60~100) | Zirconia agglomerated powder (50~88) | Zirconia fused and crushed powder (10~25) | Zirconia fused and crushed powder (10~50) | Zirconia fused and crushed powder (10~25) |
|  | Hardness | | | | | | | | | |
| Lower Layer | 700 | 780 | 850 | 750 | 800 | 680 | 710 | 690 | 810 | 530 |
| Upper layer | 480 | 380 | 400 | 450 | 450 | 410 | 450 | 820 | 750 | 700 |

TABLE 4-continued

| | Example | | | | | | | Comparative example | | |
|---|---|---|---|---|---|---|---|---|---|---|
| | 20 | 21 | 22 | 23 | 24 | 25 | 26 | 7 | 8 | 9 |
| Thermal fatigue test (number of heat cycles) | >2000 | >2000 | >2000 | >2000 | >2000 | 1100 | 700 | 300 | 1 | 10 |

EXAMPLE 27

A metal bonding layer of 150 μm in thickness composed of Ni, Co, Cr, Al, and Y (composition: 23Co—18Cr—12Al—0.3Y—bal.Ni) was formed by a plasma spraying method on a metallic substrate composed of an Ni-based superalloy IN738LC (composition: 61Ni—16Cr—8.5Co—3.4Al—1.7Mo—2.6W—1.7Ta—0.9Nb—3.4Ti). Measuring the surface roughness of the metal bonding layer immediately after forming it, it was 78 μm in Rmax and 58 μm in Rz.

Next, a ceramic layer of 130 μm in thickness was formed on this metal bonding layer by plasma-spraying a fused and crushed powder of 5 to 40 μm in particle size composed of stabilized zirconia containing $Y_2O_3$ of 8 wt %.

Measuring Vickers hardness of the surface of the ceramic layer immediately after forming it, it was 750 HV (at a load of 200 g).

After this, a test piece was made by forming a ceramic layer of 150 μm in thickness on that ceramic layer by atmospheric plasma-spraying an agglomerated-sintered powder of 10 to 50 μm in particle size composed of stabilized zirconia of the same composition. Measuring Vickers hardness of the surface of this ceramic layer immediately after forming it, it was 480 HV (at a load of 200 g).

EXAMPLES 28 TO 35

Test pieces were made in the same way as the example 27 except changing the respective ceramic layers in thickness as shown in Table 5.

After applying a process of cutting, burying and polishing to the respective test pieces obtained in the said examples 30 to 38, Vickers hardness value of each ceramic layer was measured from its sectional direction. And a thermal fatigue test of repeating a heat cycle of keeping the test pieces at 1050° C. for 30 minutes and at the room temperature for 30 minutes was performed. The result is shown in Table 5. The result of the thermal fatigue test is shown by the number of the heat cycles performed until delamination happened in each ceramic layer. And the said Vickers hardness values were nearly equal to the Vickers hardness values obtained by measuring when forming the ceramic layer on the respective test pieces.

TABLE 5

| | Example | | | | | | | | |
|---|---|---|---|---|---|---|---|---|---|
| | 27 | 28 | 29 | 30 | 31 | 32 | 33 | 34 | 35 |
| | Thickness (μm) | | | | | | | | |
| Lower layer | 130 | 100 | 50 | 200 | 30 | 230 | 240 | 260 | 270 |
| Upper layer | 150 | 180 | 230 | 80 | 220 | 20 | 40 | 20 | 10 |
| Thermal fatigue test (number of heat cycles) | >3000 | >3000 | >3000 | >3000 | >3000 | >3000 | 500 | 20 | 1 |

As explained above, since a heat-resistant member according to the invention is excellent in thermal fatigue resistance, its excellent heat resistance is kept for a long period of time.

And according to a method for evaluating quality of a heat resistant member of the invention, it is possible to easily and accurately evaluate a heat-resistant member excellent in thermal fatigue resistance and possible to manufacture such a heat-resistant member excellent in thermal fatigue resistance in good repeatability.

What is claimed is:

1. A heat-resistant member comprising;
   a metallic substrate consisting of a heat resistant alloy selected from a Ni alloy and a Co alloy, and
   a ceramic coating layer covering a surface of the metallic substrate, the ceramic coating layer being 70 μm to 180 μm in the maximum height Rmax of its profile curves and 45 μm to 140 μm in the 10-point average roughness Rz.

2. The heat-resistant member according to claim 1, further comprising a metal bonding layer consisting of at least one alloy selected from the group consisting of a Ni—Co—Cr—Al—Y alloy, a Co—Cr—Al—Y alloy, and a Ni—Cr—Al—Y alloy, said metal bonding being disposed between said metallic substrate and said ceramic coating layer.

3. A heat-resistant member comprising:
   a metallic substrate consisting of a heat resistant alloy selected from a Ni alloy and a Co alloy,
   a first ceramic coating layer covering a surface of the metallic substrate and being less than 70 μm in the maximum height Rmax of its profile curves and less than 45 μm in the 10-point average roughness Rz, and a second ceramic coating layer covering a surface of the first ceramic layer and being not less than 70 μm in the maximum height Rmax of its profile curves and not less than 45 μm in the 10-point average roughness Rz, wherein said first ceramic coating layer is 20 to 150 μm in thickness.

4. The heat-resistant member according to claim 3, further comprising a metal bonding layer consisting of at least one alloy selected from the group consisting of a Ni—Co—Cr—Al—Y alloy, a Co—Cr—Al—Y alloy, and a Ni—Cr—Al—Y alloy, said metal bonding layer being disposed between said metallic substrate and said first ceramic coating layer.

5. The heat resistant member according to claim 1, wherein Rmax and Rz satisfy the relationship 0.6× Rmax≦Rz≦Rmax.

6. The heat resistant member according to claim 1, wherein the ceramic coating layer is formed of at least one ceramic material selected from the group consisting of stabilized zirconia, rare earth oxides, calcium phosphite, and aluminum-rare earth complex oxides.

7. The heat resistant member according to claim 6, wherein the ceramic material is a rare earth oxide-stabilized zirconia containing 4.0 to 28.0 mol % of a rare earth oxide as a solid solution.

8. The heat resistant member according to claim 1, wherein the ceramic coating layer is formed of stabilized zirconia composed of zirconia having a tetragonal crystal phase of 90 vol % or more.

9. A heat-resistant member comprising:

a metallic substrate consisting of a heat resistant alloy selected from a Ni alloy and a Co alloy, and a ceramic coating layer formed on the metallic substrate and having at least a two-layered structure, said ceramic coating layer comprising:

a first ceramic coating layer covering a surface of the metallic substrate having not less than 650 Hv Vickers hardness measured by applying a load of 200 g for 30 seconds, and a second ceramic coating layer covering a surface of the first ceramic layer having less than 650 Hv in Vickers hardness measured at a load of 200 g for 30 seconds, wherein said first ceramic coating layer is 20 to 150 μm in thickness.

10. The heat-resistant member according to claim 9, further comprising a metal bonding layer consisting of at least one alloy selected from the group consisting of a Ni—Co—Cr—Al—Y alloy, a Co—Cr—Al—Y alloy, and a Ni—Cr—Al—Y alloy, said metal bonding layer being disposed between said metallic substrate and said ceramic coating layer.

* * * * *